United States Patent
Shimizu (10) Patent No.: US 12,374,114 B2
(45) Date of Patent: Jul. 29, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Tomoyuki Shimizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 434 days.

(21) Appl. No.: 17/705,365

(22) Filed: Mar. 27, 2022

(65) Prior Publication Data

US 2023/0096044 A1    Mar. 30, 2023

(30) Foreign Application Priority Data

Sep. 28, 2021  (JP) ................................ 2021-158206

(51) Int. Cl.
| | |
|---|---|
| *G06V 20/50* | (2022.01) |
| *G06T 11/00* | (2006.01) |
| *G06V 10/74* | (2022.01) |

(52) U.S. Cl.
CPC ............. *G06V 20/50* (2022.01); *G06T 11/00* (2013.01); *G06V 10/761* (2022.01)

(58) Field of Classification Search
CPC ...... G06V 20/50; G06V 10/761; G06V 10/46; G06V 20/20; G06T 11/00; G06T 2207/30108; G06T 7/73; G06T 7/0004; H04N 2201/0094; H04N 1/00307; H04N 1/32662; H04N 1/00408; H04N 1/00493

USPC .......................................................... 382/103
See application file for complete search history.

(56) References Cited

U.S. PATENT DOCUMENTS

| | | | |
|---|---|---|---|
| 8,913,136 B2 | 12/2014 | Iwase | |
| 2012/0057032 A1* | 3/2012 | Jang | ..................... G06T 19/006 348/207.1 |
| 2015/0310617 A1* | 10/2015 | Hara | .................... H04N 23/631 345/633 |
| 2016/0284131 A1 | 9/2016 | Koga | |

FOREIGN PATENT DOCUMENTS

| | | |
|---|---|---|
| JP | 5803199 | 11/2015 |
| JP | 2016184296 | 10/2016 |
| JP | 2019003550 | 1/2019 |

OTHER PUBLICATIONS

"Notice of Reasons for Refusal of Japan Counterpart Application No. 2021-158206", issued on May 27, 2025, with English translation thereof, p. 1-p. 6.

* cited by examiner

*Primary Examiner* — Neil R McLean
(74) *Attorney, Agent, or Firm* — JCIPRNET

(57) ABSTRACT

An information processing apparatus includes a processor configured to: acquire an object image that is an image obtained by imaging an object; identify, at each step of a procedure to be performed on the object, whether or not the object image is in a specific state associated with the step; display, in a case where the object image is in the specific state, the object image in such a manner that first content associated with the specific state is superimposed on the object image; and display, in a case where the object image is not in the specific state, second, different content associated with the step.

9 Claims, 10 Drawing Sheets

WORK: PAPER JAM

| STEP NUMBER | EXISTING MANUAL | FEATURE POINT DATA FOR AR | AR CONTENT | | IMAGE RECOGNITION PRIORITY ORDER | | COMPARISON DATA FOR NON-AR | NON-AR CONTENT | |
|---|---|---|---|---|---|---|---|---|---|
| | | | DISPLAY CONTENTS | DISPLAY POSITION BASED ON FEATURE POINT | 1 | 2 | | DISPLAY CONTENTS | DISPLAY POSITION BASED ON WINDOW |
| 1 | TEXT 1 + EXISTING MANUAL IMAGE 1 | FEATURE POINT DATA 1 | AR CONTENT 1 | DISPLAY POSITION 1 | SIMILARITY | NULL | COMPARISON IMAGE 1 | NON-AR CONTENT 1 | UPPER RIGHT |
| 2 | TEXT 2 + EXISTING MANUAL IMAGE 2 | FEATURE POINT DATA 2 | AR CONTENT 2 | DISPLAY POSITION 2 | SIMILARITY | NULL | COMPARISON IMAGE 2 | NON-AR CONTENT 2 | BELOW |
| 3 | TEXT 3 + EXISTING MANUAL IMAGE 3 | FEATURE POINT DATA 3 | AR CONTENT 3 | DISPLAY POSITION 3 | SIMILARITY | CHARACTERS | COMPARISON IMAGE 3 + COMPARISON CHARACTER 3 | NON-AR CONTENT 3 | WHOLE AREA |
| 4 | | FEATURE POINT DATA 4 | AR CONTENT 4 | DISPLAY POSITION 4 | CHARACTERS | SIMILARITY | COMPARISON IMAGE 4 + COMPARISON CHARACTER 4 | NON-AR CONTENT 4 | BELOW |
| 5 | TEXT 4 | FEATURE POINT DATA 5 | AR CONTENT 5 | DISPLAY POSITION 5 | NULL | NULL | NULL | NULL | NULL |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-158206 filed Sep. 28, 2021.

BACKGROUND

(i) Technical Field

The present disclosure relates to an information processing apparatus, an information processing method, and a non-transitory computer readable medium.

(ii) Related Art

In Japanese Unexamined Patent Application Publication No. 2019-3550, an information processing apparatus including imaging means for imaging an object, setting means for setting an object as a superimposition target on the basis of a result of imaging by the imaging means, identifying means for identifying the type of content associated with the superimposition target, and control means for controlling display of the superimposition target and the content to be displayed on a display screen, is disclosed. The control means determines, in accordance with the identified type of the content, whether to perform tracking display for performing superimposition display by causing a display mode of the content to track a superimposition target image or non-tracking display for displaying the content at a predetermined position on the display screen.

SUMMARY

A technique for, in order to notify a user of steps of a procedure, capturing an image of an object on which the procedure is to be performed and displaying the steps of the procedure to be superimposed on the captured image, is available. For example, there is a technique for, when a failure occurs in an electrical product, acquiring an image of the electrical product in which the failure has occurred and displaying steps of a repair on the acquired image. To detect a position in the acquired image at which a step of the repair is to be displayed, positioning is performed by, for example, using an augmented reality (AR) marker or using a feature point of the electrical product.

However, even if an AR marker or a feature point of the electrical product is arranged within the image, the AR marker or the feature point is not recognizable depending on the tilt of a camera or influence of a light source, and it may be difficult to detect the correct position at which the step of the procedure is to be displayed to fit the image.

Aspects of non-limiting embodiments of the present disclosure relate to prompting a user to complete a procedure even in a case where a correct position at which a step of a procedure is to be displayed to fit an image is not detectable.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire an object image that is an image obtained by imaging an object; identify, at each step of a procedure to be performed on the object, whether or not the object image is in a specific state associated with the step; display, in a case where the object image is in the specific state, the object image in such a manner that first content associated with the specific state is superimposed on the object image; and display, in a case where the object image is not in the specific state, second, different content associated with the step.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the drawings.

<Entire Configuration of Operation Navigation System>

Figure 1:
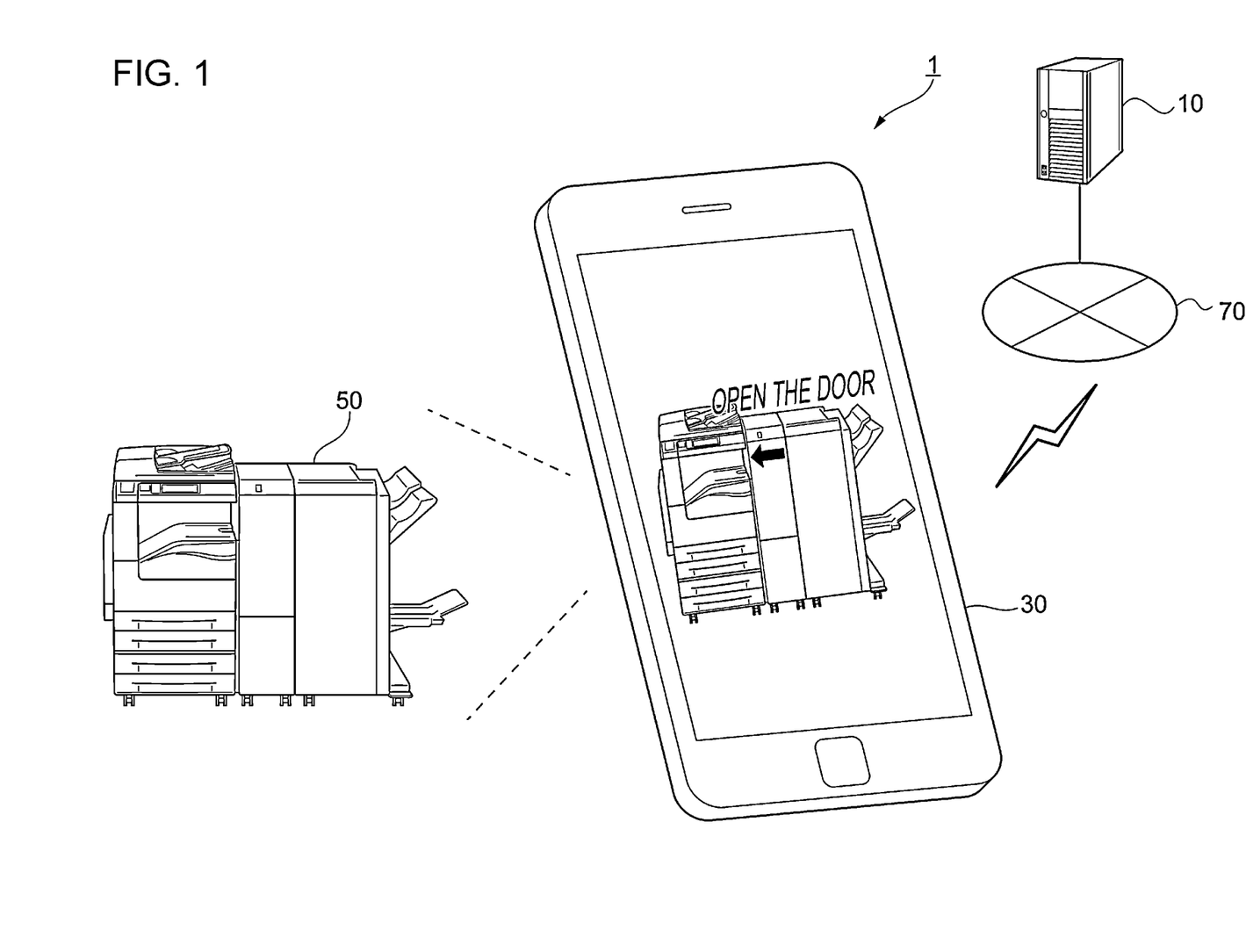
FIG. 1 is a diagram illustrating an example of the entire configuration of an operation navigation system according to an exemplary embodiment.

FIG. 1 is a diagram illustrating an example of the entire configuration of an operation navigation system 1 according to an exemplary embodiment. The operation navigation system 1 according to this exemplary embodiment includes a server 10 that provides information about steps of a procedure to be performed by a user to a user terminal 30 to aid the user and the user terminal 30 that displays the information about the steps of the procedure provided from the server 10. The server 10 and the user terminal 30 are connected via a network 70.

The operation navigation system 1 also includes an image forming apparatus 50 as an object on which the user performs a procedure. In this exemplary embodiment, the image forming apparatus 50 is used as an example of the object on which the user performs the procedure. However, the object on which the user performs the procedure is not limited to the image forming apparatus 50. Furthermore, the procedure performed by the user is not limited to given examples. The user performs a procedure by following a predetermined series of steps, and examples of procedure include a procedure for clearing a paper jam in the image forming apparatus 50, a procedure for replacing toner, a procedure for changing settings of the image forming apparatus 50, and a procedure for performing maintenance or inspection of the image forming apparatus 50. The image forming apparatus 50 may be connected to one of or both the server 10 and the image forming apparatus 50 or may not be connected to one of or both the server 10 and the image forming apparatus 50.

In the operation navigation system 1, the server 10, which is an example of an information processing apparatus, sequentially transmits to the user terminal 30 information indicating a step of the procedure to be performed, in accordance with the progress of the procedure being performed by the user. More specifically, the server 10 performs processing for extracting a feature point from an imaged image of the image forming apparatus 50 acquired by the user using the user terminal 30. Then, in the case where the extracted feature point matches a predetermined feature point, the server 10 transmits display position information based on the feature point and information indicating a current step of the procedure. The "current step" of the procedure refers to the "step to be performed at the moment" and "information indicating a step to be performed at the moment" may be referred to as "current step information".

Furthermore, in the case where a predetermined feature point is not extractable from an imaged image, the server 10 transmits display position information based on a display region in which the imaged image is displayed and current step information to the user terminal 30. The "display region in which an imaged image is displayed" represents a region in the display screen of the user terminal 30 in which an imaged image is displayed. More specifically, a window on the user terminal 30 in which an imaged image is displayed is an example of the "display region in which an imaged image is displayed". The display position information based on the display region in which an imaged image is displayed represents display position information based on a window. For example, display position information is identified by a part corresponding to a window and indicates, for example, an upper right region, a lower half region, or the like of the window. In other words, the display position information based on the display region in which an imaged image is displayed represents positional information that is defined independent of the position of a feature point in the imaged image.

Furthermore, current step information is set in advance for each step separately for the case where a feature point has been extracted and the case where a feature point has not been extracted. The case where a feature point has been extracted is an example of a "specific state", and current step information that has been set in advance for the case where a feature point has been able to be extracted is an example of "specific content". In contrast, current step information that has been set in advance for the case where a feature point has not been extracted is an example of "non-specific content".

The user terminal 30 captures an image of the image forming apparatus 50, which is an object on which the user performs the procedure, transmits the acquired imaged image to the server 10, and displays the imaged image on the user terminal 30. Furthermore, the user terminal 30 acquires current step information and display position information from the server 10, and displays the acquired current step information on the user terminal 30 on the basis of the acquired display position information.

In the case where the display position information is based on a feature point of the imaged image, current step information is displayed in a superimposed manner at a position in the image forming apparatus 50 displayed on the screen of the user terminal 30. Then, for the period during which a predetermined feature point is being extracted, the current step information is displayed tracking the behavior of the image forming apparatus 50 displayed on the screen.

In the case where the display position information indicates a display position based on the display screen, the current step information is displayed in a predetermined region independent of the behavior of the image forming apparatus 50 displayed on the screen of the user terminal 30.

<Example of Display Screen>

Figure 2:
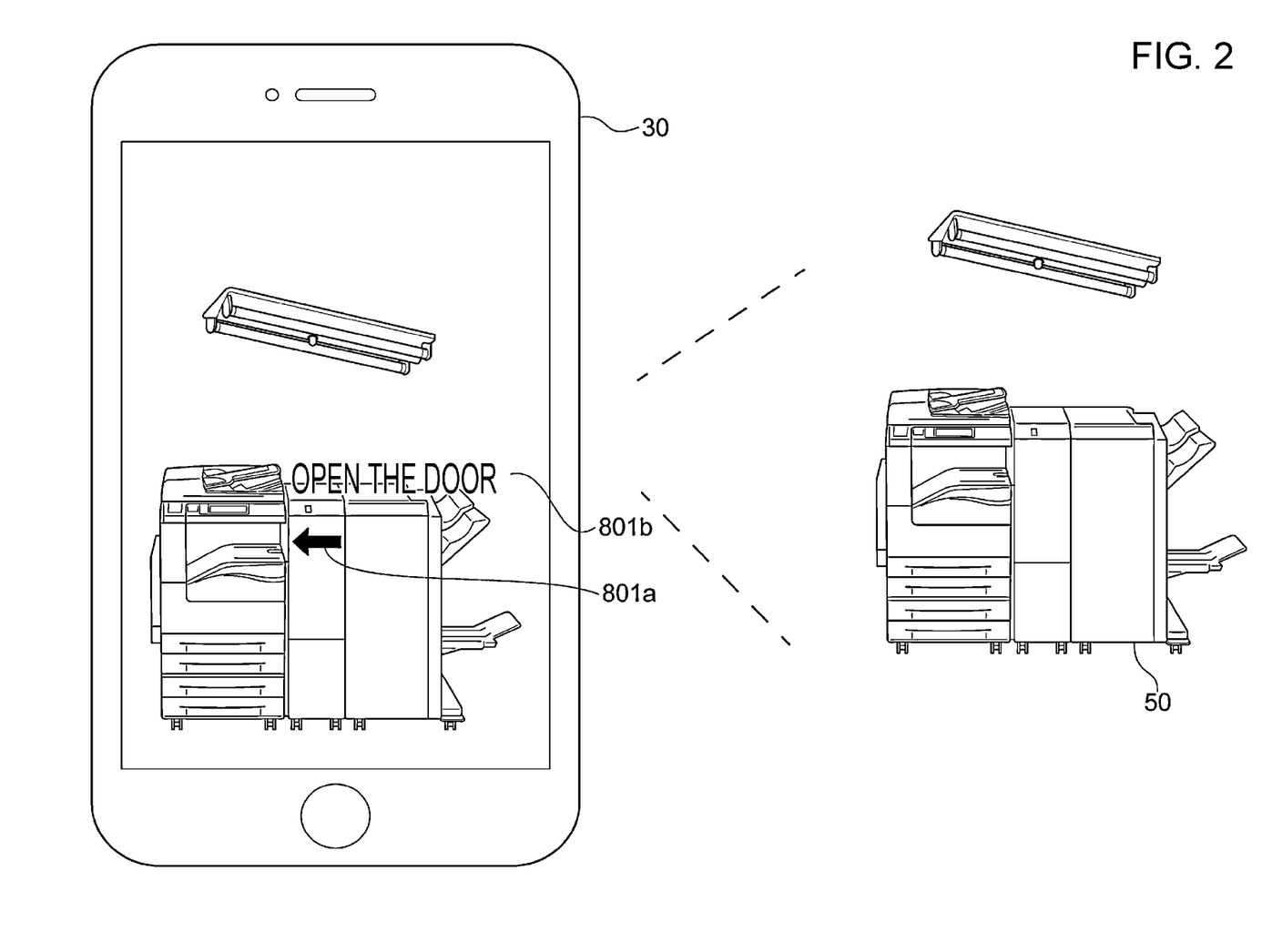
FIG. 2 is a diagram for explaining an example of contents displayed on a screen of a user terminal in a case where a feature point of an image forming apparatus has been extracted.

FIG. 2 is a diagram for explaining an example of contents displayed on the screen of the user terminal 30 in the case where a feature point of the image forming apparatus 50 has been extracted.

The example of FIG. 2 illustrates a state in which a paper gam has occurred in a paper folding unit of the image forming apparatus 50 and a user wants to perform a procedure for clearing the paper jam. The current step the user is to perform is opening the door of the paper folding unit. The user captures, using the user terminal 30, an image of the image forming apparatus 50. The imaged image is displayed on the entire display screen of the user terminal 30, and current step information 801*a* and 801*b* are displayed superimposed on the imaged image on the basis of the position of a feature point of the imaged image. The current step information 801*a* is an arrow mark arranged in a superimposed manner at a position of the door to be opened and indicating a door opening direction. The current step information 801*b* includes characters "Open the door" arranged above the current step information 801*a*.

The user follows instructions indicated by the current step information 801*a* and 801*b*.

Figure 3:
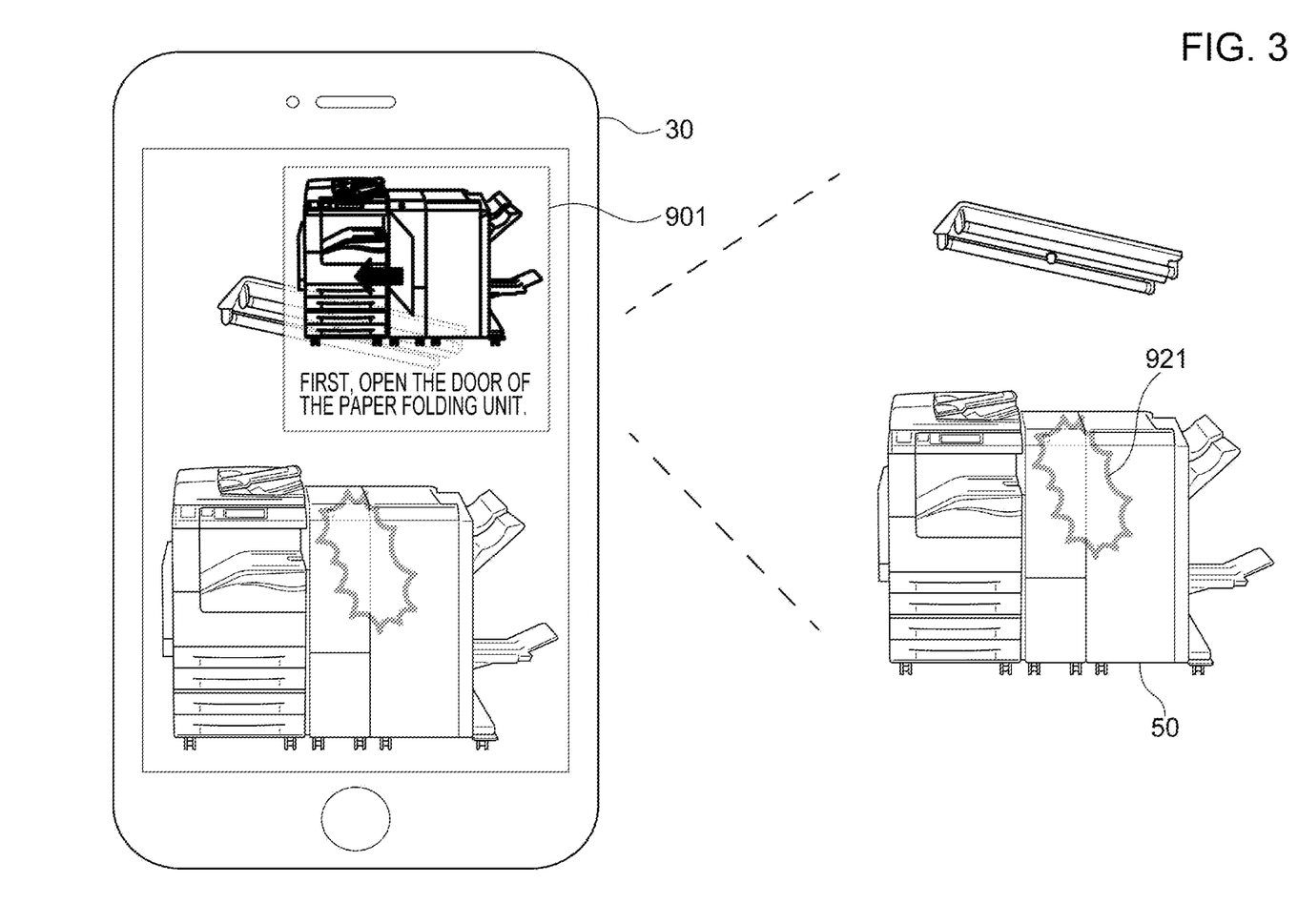
FIG. 3 is a diagram for explaining an example of contents displayed on the screen of the user terminal in a case where a feature point of the image forming apparatus has not been extracted.

FIG. 3 is a diagram for explaining an example of contents displayed on the screen of the user terminal 30 in the case where a feature point of the image forming apparatus 50 has not been extracted.

In the example of FIG. 3, the case of the step for opening the door of the paper folding unit is illustrated, as in the example of FIG. 2. In the example of FIG. 3, light of a fluorescent lamp above the image forming apparatus 50 is applied to the image forming apparatus 50, and reflected light 921 is generated. Although the angle of view for capturing an image by the user terminal 30 includes the image forming apparatus 50, the reflected light 921 makes it difficult to detect a feature point of the image forming apparatus 50. Thus, a feature point of the image forming apparatus 50 is not extractable. In the case where a feature point is not extractable as described above, instead of the current step information 801*a* and 801*b*, predetermined current step information 901 is displayed in an upper right region of the entire display screen in which an imaged image is displayed. The current step information 901 is an image in which a diagram indicating the state in which the door of the paper folding unit of the image forming apparatus 50 is opened and characters "First, open the door of the paper folding unit" are combined together. The user refers to the current step information 901 displayed on the user terminal 30.

<Hardware Configuration of Server>

Figure 4:
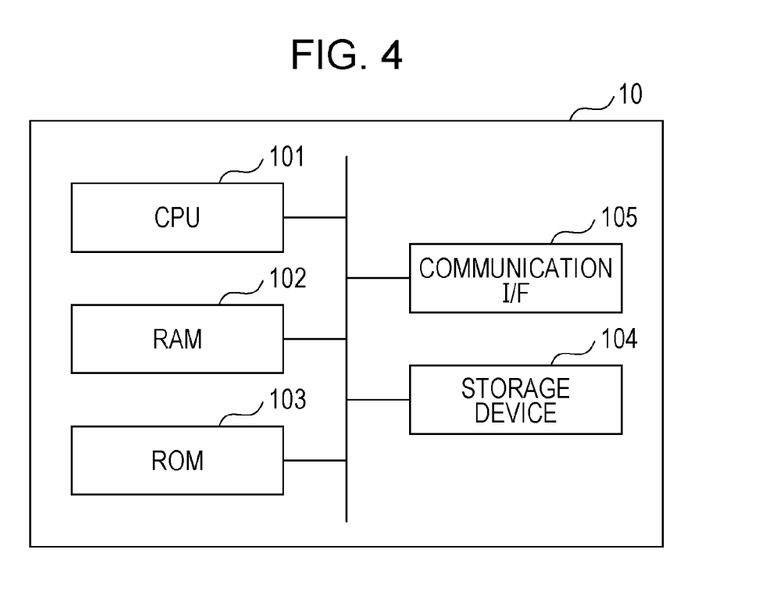
FIG. 4 is a diagram illustrating an example of the hardware configuration of a server in the operation navigation system.

FIG. 4 is a diagram illustrating an example of the hardware configuration of the server 10 in the operation navigation system 1.

The server 10 is, for example, an electronic apparatus such as a server machine or a personal computer (PC).

The server 10 includes a central processing unit (CPU) 101 as computing means, a random access memory (RAM) 102, a read only memory (ROM) 103, and a storage device 104 as storing means, and a communication interface (I/F) 105 for communicating with an external apparatus or the like. The RAM 102 is used as an operation memory for the CPU 101 to perform arithmetic processing. Programs and data such as set values prepared in advance are held in the ROM 103. The storage device 104 is means for storing programs and data. The storage device 104 is, for example, a magnetic disk device, a solid state drive (SSD), or the like. The CPU 101 is an example of a processor.

<Hardware Configuration of User Terminal>

Figure 5:
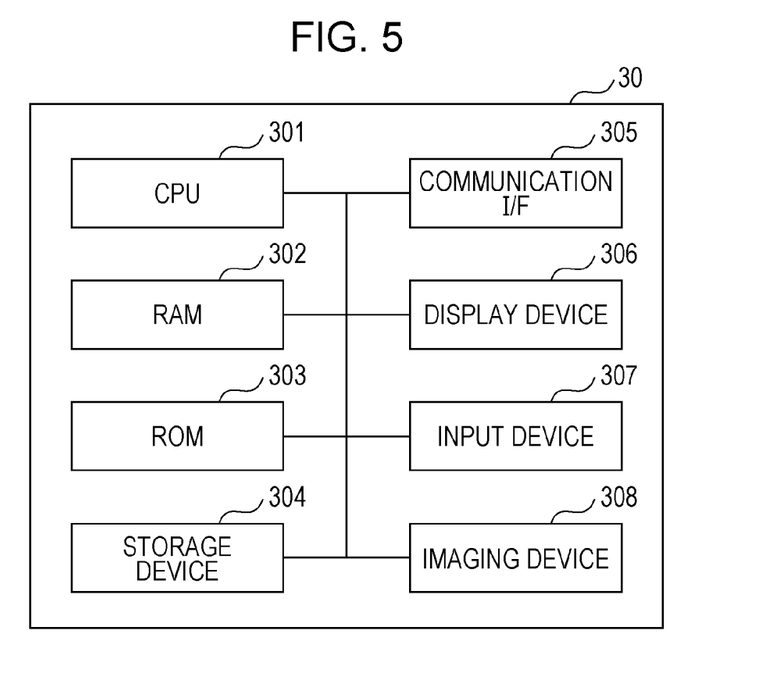
FIG. 5 is a diagram illustrating an example of the hardware configuration of a user terminal in the operation navigation system.

FIG. 5 is a diagram illustrating an example of the hardware configuration of the user terminal 30 in the operation navigation system 1.

The user terminal 30 includes a CPU 301 as computing means, a RAM 302, a ROM 303, and a storage device 304 as storing means, a communication I/F 305 for communicating with an external apparatus or the like, a display device 306 for presenting information to a user, and an input device 307 to be used by the user to perform inputting to the user terminal 30. The user terminal 30 also includes an imaging device 308 that captures an image around the user terminal 30. The user terminal 30 is, for example, an electronic apparatus such as a smartphone, a tablet PC, or a head-mounted display carried by the user.

The display device 306 is a device that has a function for displaying an image and presenting information to the user. The display device 306 is, for example, a liquid crystal display or an organic electroluminescent (EL) display. The input device 307 is a device that has a function for allowing the user to input information to the user terminal 30. The input device 307 is, for example, a touch panel or a physical button. The imaging device 308 captures an image of the image forming apparatus 50 in a real space and generates image information. The imaging device 308 includes, for example, an optical system that converges incident light and an image sensor as imaging means for detecting the light converged by the optical system.

<Hardware Configuration of Image Forming Apparatus>

Figure 6:
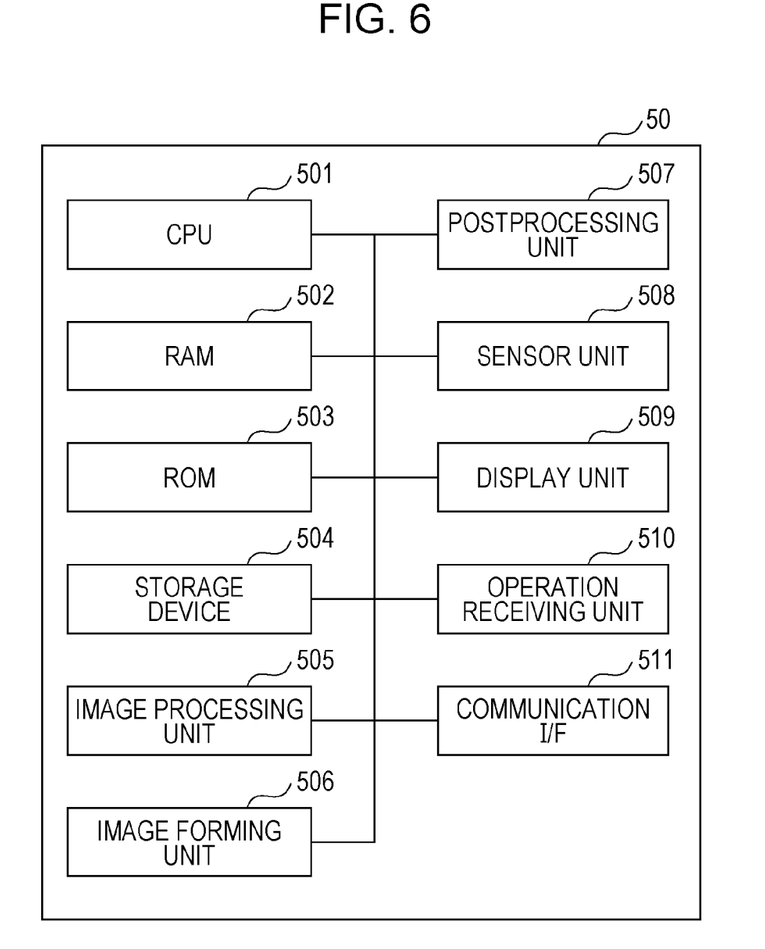
FIG. 6 is a diagram illustrating an example of the hardware configuration of the image forming apparatus in the operation navigation system.

FIG. 6 is a diagram illustrating an example of the hardware configuration of the image forming apparatus 50 in the operation navigation system 1.

The image forming apparatus 50 includes a CPU 501 as computing means, and a RAM 502 and a ROM 503 as storing means.

The image forming apparatus 50 also includes a storage device 504 that stores image data, management data, and the like, an image processing unit 505 that performs image processing, such as color correction and gradation correction, on the image data, an image forming unit 506 that forms an image on paper in, for example, an electrophotographic method or an inkjet method, and a postprocessing unit 507 that performs, for example, tri folding or binding processing for paper on which an image has been formed.

The image forming apparatus 50 also includes a sensor unit 508 that monitors the operation state of the image forming apparatus 50. The sensor unit 508 is, for example, a sensor identifying the open/closed state of the door of the image forming apparatus 50 or a sensor identifying that a print medium is jammed in a transport path, which is part of the internal structure of the image forming apparatus 50. The image forming apparatus 50 also includes a display unit 509 that displays a user interface screen, an operation receiving unit 510 that receives an operation performed by a user, and a communication I/F 511 that is used for communication with an external apparatus or the like.

Figure 7:
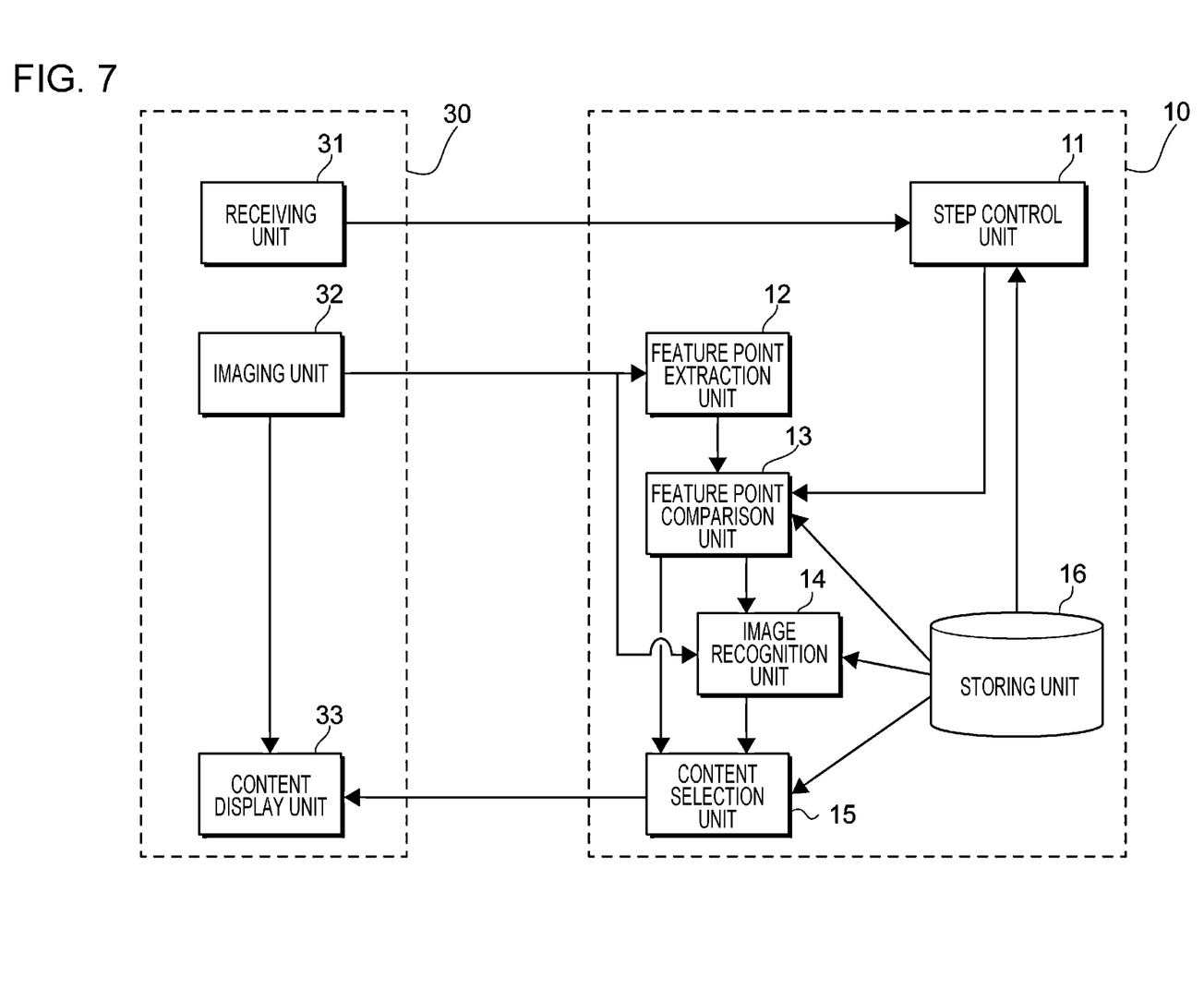
FIG. 7 is a diagram illustrating a functional configuration of the user terminal and the server.

FIG. 7 is diagram illustrating a functional configuration of the user terminal 30 and the server 10.

<Functional Configuration of User Terminal>

The user terminal 30 includes a receiving unit 31 that receives an operation from the user, an imaging unit 32 that captures an image of the image forming apparatus 50 (see FIG. 1), and a content display unit 33 that displays the imaged image captured by the imaging unit 32 and an image received from the server 10.

The receiving unit 31 receives information input from the user. The receiving unit 31 receives, for example, information for identifying a procedure to be performed by the user for the image forming apparatus 50 from the user. The receiving unit 31 also receives information indicating that the user is performing a procedure and has proceeded to the next step from the user. The receiving unit 31 transmits the information received from the user to the server 10 through the communication I/F 305 (see FIG. 5).

The imaging unit 32 captures an image of the image forming apparatus 50 and transmits the captured image to the server 10 through the communication I/F 305.

The content display unit 33 displays an image captured by the imaging unit 32 on the display device 306 (see FIG. 5). The content display unit 33 also acquires information about a step of a procedure from the server 10 and displays the information about the step of the procedure on the display device 306.

<Functional Configuration of Server>

The server 10 includes a step control unit 11 that identifies which step of a procedure the user needs to perform at the moment, a feature point extraction unit 12 that extracts a feature point of an object on which the user is performing the procedure from an imaged image acquired from the user terminal 30, a feature point comparison unit 13 that compares the feature point extracted by the feature point extraction unit 12 with a predetermined feature point and determines whether or not a predetermined condition is satisfied, an image recognition unit 14 that performs image recognition processing for the acquired imaged image and determines whether or not a predetermined condition is satisfied, a content selection unit 15 that selects content to be displayed on the user terminal 30 on the basis of results of the determination performed by the feature point comparison unit 13 and the determination performed by the image recognition unit 14, and a storing unit 16 that stores information about a step of an operation.

The step control unit 11 acquires information for identifying a procedure that the user performs on the image forming apparatus 50 and acquires a step of the procedure from information about a step of the procedure stored in the storing unit 16. Then, the step control unit 11 identifies a current step. A current step may be identified in various methods. For example, a current step may be identified by determining whether or not an image of the image forming apparatus 50 received from the user terminal 30 is similar to an image set in advance for each step.

Furthermore, the user may determine progress of steps of the procedure and identify a current step on the basis of results of the his/her determination.

Furthermore, information detected by a sensor provided in the image forming apparatus 50 may be acquired, and a current step may be identified on the basis of the information acquired from the sensor. For example, a current step may be identified on the basis of information detected by a sensor for identifying the open/closed state of a door of the image forming apparatus 50, information detected by a sensor for identifying that a print medium is jammed in a transport path, which is part of the internal structure of the image forming apparatus 50, or the like.

The feature point extraction unit 12 extracts a feature point serving as the basis of a position at which current step information is to be displayed from the imaged image acquired from the user terminal 30. A feature point represents a feature value based on the shape of an object on which the user performs the procedure. A feature point is calculated from a local region of an imaged image. For example, an edge or a corner in an image is extracted. For example, scale invariant feature transform (SIFT) or speeded up robust features (SURF) is used as a method for extracting a feature point. A feature point only needs to be used to determine a position at which AR content is to be displayed, and a feature value may be extracted in any method. An AR marker may be used as a feature point. An AR marker is, for example, a two-dimensional image added to the image forming apparatus 50.

The feature point comparison unit 13 compares a feature point extracted by the feature point extraction unit 12 with feature point data stored in the storing unit 16, which will be described later, and determines, on the basis of the result of the comparison, whether or not the extracted feature point and a feature point of the feature point data match. The extracted feature point and the feature point of the feature point data are not necessarily completely the same, and for example, in the case where the number or ratio of same feature points is larger than a predetermined value, it may be determined that the extracted feature point and the feature point of the feature point data match.

The image recognition unit 14 performs image recognition of an acquired imaged image, and calculates the similarity between the acquired imaged image and an image stored in the storing unit 16, which will be described later. The image recognition unit 14 also calculates the similarity between characters recognized by character recognition processing on the acquired imaged image and characters stored in the storing unit 16, which will be described later.

The content selection unit 15 selects, based on the result of the determination by the feature point comparison unit 13 as to whether or not feature points match and the similarity calculated by the image recognition unit 14, content to be displayed on the user terminal 30. Then, the content selection unit 15 outputs the selected content from the server 10 to the user terminal 30.

The storing unit 16 stores procedure information that defines steps for performing a procedure. The procedure information contains, for each step, image information and/or character information to be presented to the user at each step of the procedure to inform the user what to do.

<Configuration of Procedure Information>

Figure 8:
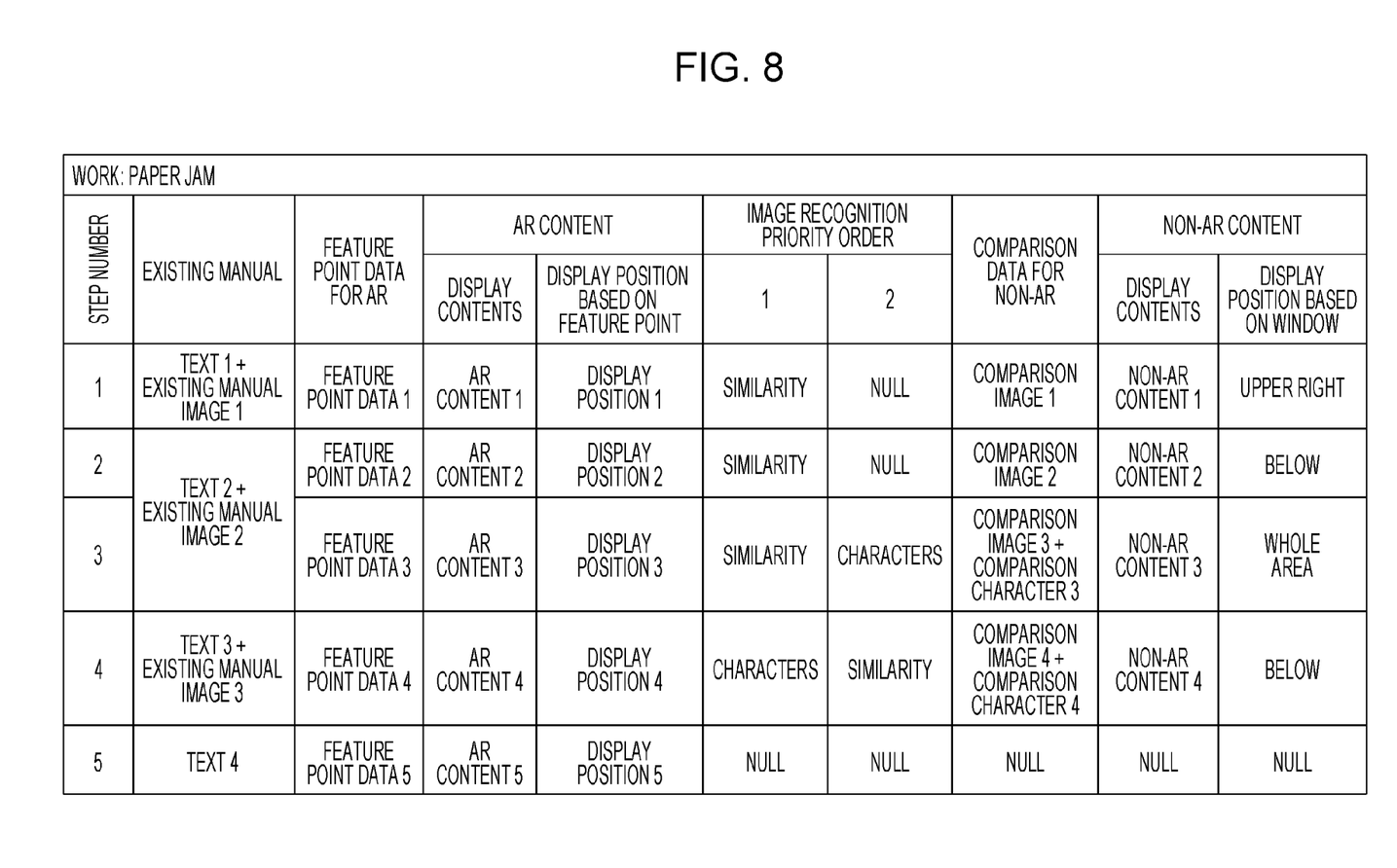
FIG. 8 is a table for explaining an example of information about steps of a procedure.

FIG. 8 is a table for explaining an example of procedure information.

Procedure information is prepared for each type of work. The user performs the work by following a procedure comprising a predefined series of steps. Specifically, for example, procedure information is stored for each type of work such as clearing a paper jam in the image forming apparatus 50, replacing toner in the image forming apparatus 50, and performing maintenance or inspection of the image forming apparatus 50.

A series of steps is predefined for each type of work. The example of FIG. 8 illustrates an exemplary procedure information to work on "paper jam" as indicated by "work". The procedure for working on a "paper jam" includes five steps 1, 2, 3, 4, and 5. The user performs Step 1, and then performs Step 2. The user performs all the steps sequentially to complete the work.

For each step number, an existing manual, feature point data for AR, AR content, image recognizing means, comparison data for non-AR, and non-AR content are stored in association.

The existing manual is on a computer communication network and is prepared to display a procedure in, for example, HTML format on the user terminal 30. The existing manual includes text, an image, or the like for notifying a user of a procedure. The existing manual is displayed in a region different from a region in which an imaged image is displayed. The existing manual is an example of non-specific content.

Feature point data for AR represents data to be compared with a feature point of an object for which a user performs a procedure, the feature point being extracted from an imaged image.

AR content contains display contents and a display position based on a feature point of an object for which the user performs a procedure. Display contents represent current step information displayed on the user terminal 30. For example, display contents include a diagram such as an arrow, an image, characters, or a combination of a diagram, an image, and characters. The display contents are not necessarily static images and may be moving images.

The display position based on a feature point is a position corresponding to a feature point of an object on which the user performs a procedure and is based on the position of the object in an imaged image. That is, in the case where a feature point is extracted from an image received from the user terminal 30, current step information is displayed at a position corresponding to the feature point, and the current step information is displayed tracking the movement of the feature point of the image forming apparatus 50 in the image.

The image recognition priority order represents the order in which image recognizing means used for determining whether or not non-AR content that is displayed independent of the position of a feature point in an imaged image is to be displayed is used in the case where no feature point is obtained from an imaged image. In the example of FIG. 8, priority order numbers 1 and 2 are set as the priority order for the image recognizing means for each step of the procedure. "Similarity" represents means for calculating the degree of similarity between an imaged image and a predetermined image. "Characters" represents means for calculating the degree of similarity between characters extracted by character recognition processing on an imaged image and predetermined characters. "Null" represents a state in which no image recognizing means is defined. In the case where image recognizing means is defined for numbers 1 and 2, the image recognizing means of number 1 is used and then the image recognizing means of number 2 is used. Accordingly, for example, character recognition may be prioritized over as the image recognizing means at a step where characters are displayed on a display device provided in an object on which a procedure is performed.

Comparison data for non-AR represents data to be compared with when image recognizing means is used. Comparison data for non-AR includes an image or characters set in advance for each step of a procedure.

Non-AR content includes display contents and a display position based on a window. The display contents are displayed on the user terminal 30 to inform the user what to do. Non-AR content is, for example, character information or image information. The display contents are not necessarily static images and may be moving images.

As a display position based on a window, for example, an upper right region of the window is specified as "upper right". In this exemplary embodiment, non-AR content also includes content displayed superimposed not on a feature point in an imaged image. For example, an image that is displayed in a superimposed manner in accordance with the position of a window, without using the position of a feature point of the image forming apparatus 50 in an imaged image as a reference, is also included in non-AR content. Specifically, a semi-transparent image that is displayed in a superimposed manner on the "whole area" of the window or a semi-transparent image that is displayed in a superimposed manner in an upper right region of the window is also included in non-AR content.

In FIG. 8, as an existing manual, "text 1" and "existing manual image 1" are associated with the step number 1. Furthermore, "feature point data 1" as feature point data for AR, "AR content 1" as display contents of AR content, and "display position 1" as a display position based on a feature point of the AR content are associated with the step number 1. Furthermore, "similarity" as priority order number 1 of image recognition priority order and "null" as priority order number 2 of the image recognition priority order are associated with the step number 1. Furthermore, "comparison image 1" as comparison data for non-AR, "non-AR content 1" as display contents of non-AR content, and "upper right" as a display position based on a window are associated with the step number 1.

Hereinafter, a process performed by the server 10 will be described.

<Process Performed by Server>

Figure 9:
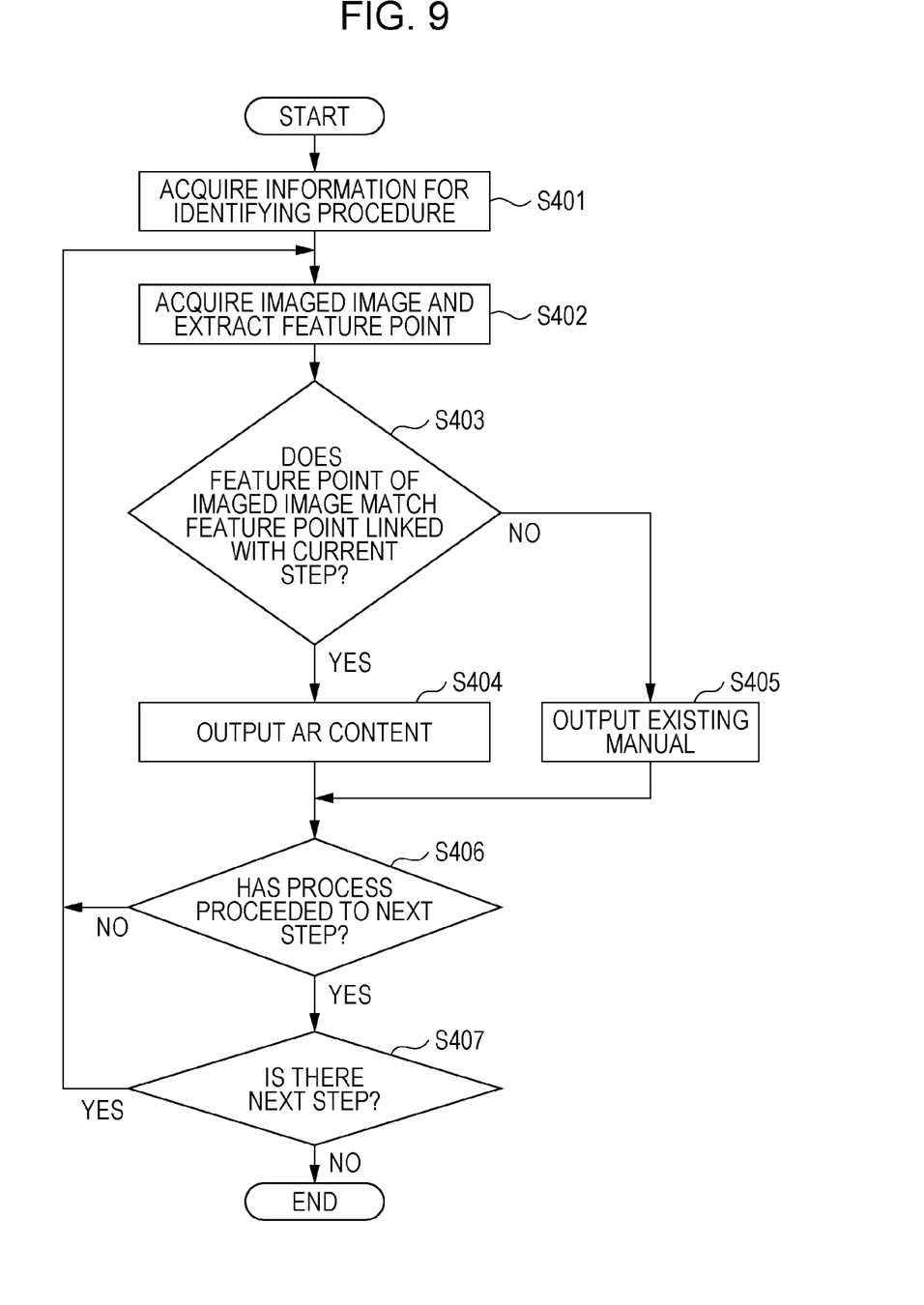
FIG. 9 is a flowchart illustrating an example of a process performed by the server for outputting content to be displayed on the user terminal based on an imaged image of the image forming apparatus.

FIG. 9 is a flowchart illustrating an example of a process performed by the server 10 for outputting content to be displayed on the user terminal 30 based on an imaged image of the image forming apparatus 50.

An example of a process performed by the server 10 for outputting content to be displayed on the user terminal 30 based on an imaged image of the image forming apparatus 50 will be described with reference to FIGS. 7 and 9.

For example, when a user operates the user terminal 30 to execute an application program for using the operation navigation system 1, the operation navigation system 1 starts.

First, the step control unit 11 acquires from the user terminal 30 information for identifying a procedure to be performed by the user on the image forming apparatus 50, and refers to procedure information stored in the storing unit 16 (step 401).

Next, the feature point extraction unit 12 acquires from the user terminal 30 an imaged image of the image forming apparatus 50 and extracts a feature point of the acquired imaged image (step 402).

The feature point comparison unit 13 determines whether or not the feature point extracted in step 402 matches feature point data linked with the current step (step 403). In the case where the feature point comparison unit 13 determines that the feature point extracted in step 402 matches the feature point data (YES in step 403), the content selection unit 15 outputs AR content to the user terminal 30 (step 404). In contrast, in the case where it is determined in step 403 that the extracted feature point does not match the feature point data (NO in step 403), the content selection unit 15 outputs an existing manual linked with the current step to the user terminal 30 (step 405).

After the content selection unit 15 outputs the AR content or the existing manual to the user terminal 30 in step 404 or 405, the step control unit 11 determines whether or not the process has proceeded to the next step (step 406). In the case where it is determined that the process has not proceeded to the next step (NO in step 406), the process returns to step 402 in which the feature point extraction unit 12 acquires an imaged image and extracts a feature point. In the case where it is determined in step 406 that the process has proceeded to the next step (YES in step 406), the step control unit 11 determines whether or not there is a next step (step 407). In the case where it is determined that there is a next step (YES in step 407), the process returns to step 402 in which the feature point extraction unit 12 acquires an imaged image and extracts a feature point. In contrast, in the case where it is determined in step 407 that there is no next step (NO in step 407), because all the steps of the procedure are completed, the process ends.

In the process illustrated in FIG. 9, in the case where a feature point extracted from an imaged image does not match feature point data linked with the current step, an existing manual linked with the current step is output. As described above, in this exemplary embodiment, in the case where an extracted feature point does not match feature point data, AR content is not output. Thus, displaying AR content at an unexpected position is prevented. In the case where no feature point is extractable, an existing manual linked with the current step is output. The user continues to perform the procedure by referring to the output existing manual.

In the process illustrated in FIG. 9, in the case where an extracted feature point does not match feature point data, an existing manual is output. However, in the case where an extracted feature point does not match feature point data, image recognition may be performed so that content to be output is selected.

Figure 10:
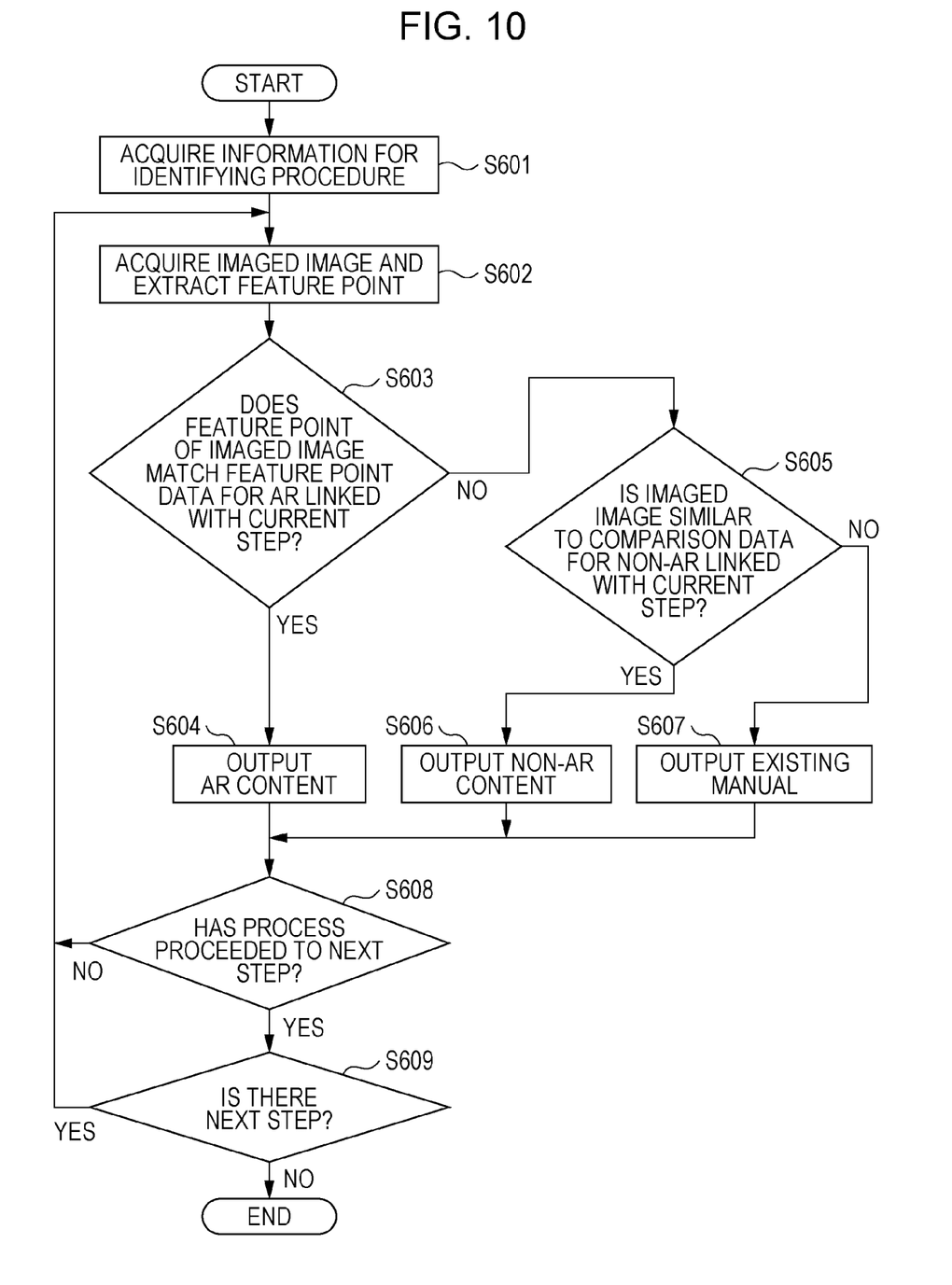
FIG. 10 is a flowchart illustrating an example of a process of the server for performing image recognition and determining content to be output in a case where a feature point has not been extracted.

FIG. 10 is a flowchart illustrating an example of a process of the server 10 for performing image recognition and selecting content to be output in the case where an extracted feature point does not match feature point data.

An example of a process performed by the server 10 for outputting information to be displayed to the user terminal 30 based on an imaged image will be described below with reference to FIGS. 7 and 10.

First, the step control unit 11 acquires from the user terminal 30 information for identifying a procedure to be performed by the user for the image forming apparatus 50 (step 601).

Next, the feature point extraction unit 12 performs processing for acquiring from the user terminal 30 an image obtained by imaging the image forming apparatus 50 by the user terminal 30 and extracting a feature point (step 602).

Then, the feature point comparison unit 13 determines whether or not the feature point extracted in step 602 matches feature point data linked with the current step (step 603). In the case where the feature point comparison unit 13 determines that the feature point extracted in step 602 matches the feature point data (YES in step 603), the content selection unit 15 outputs to the user terminal 30 AR content linked with the current step (step 604). In contrast, in the case where the feature point comparison unit 13 determines in step 603 that the extracted feature point does not match the feature point data (NO in step 603), the image recognition unit 14 determines whether or not the imaged image is similar to comparison data for non-AR linked with the current step (step 605). The determination as to whether or not the imaged image is similar to the comparison data for non-AR is performed by, for example, determining whether or not the similarity calculated by the image recognition unit 14 is larger than a predetermined value. A condition used for determining whether or not the imaged image is similar to the comparison data for non-AR is an example of a "predetermined condition". In the case where the image recognition unit 14 determines that the imaged image is similar to the comparison data for non-AR (YES in step 605), the content selection unit 15 outputs non-AR content to the user terminal 30 (step 606). In the case where the image recognition unit 14 determines in step 605 that the imaged image is not similar to the comparison data for non-AR (NO in step 605), the content selection unit 15 outputs an existing manual (step 607).

After information to be displayed is output to the user terminal 30 in step 604, 606, or 607, the step control unit 11 determines whether or not the process has proceeded to the next step (step 608). In the case where it is determined that the process has not proceeded to the next step (NO in step 608), the process returns to step 602 in which the feature point extraction unit 12 acquires an imaged image and extracts a feature point. In the case where it is determined in step 608 that the process has proceeded to the next step (YES in step 608), the step control unit 11 determines whether or not there is a next step (step 609). In the case where it is determined that there is a next step (YES in step 609), the process returns to step 602 in which the feature point extraction unit 12 acquires an imaged image and extracts a feature point. In contrast, in the case where it is determined in step 609 that there is no next step (NO in step 609), because all the steps of the procedure are completed, the process ends.

As described above, in the process illustrated in FIG. 10, in the case where image recognition is performed and an acquired image is similar to a predetermined image, predetermined non-AR content is output. In order that AR content is displayed in a superimposed manner at a specific position in an image, information for identifying the position at which the AR content is to be displayed is required, depending on a feature point or the like in the image. However, although from the viewpoint of a unit of a step of the procedure, AR content does not need to be displayed in a superimposed manner at a specific position in an image, there may be a plurality of pieces of content useful for notifying a user of the procedure. In the process illustrated in FIG. 10, one of a plurality of pieces of useful content is selected based on the result of image recognition, and the selected content is output to the user terminal 30.

Figure 11:
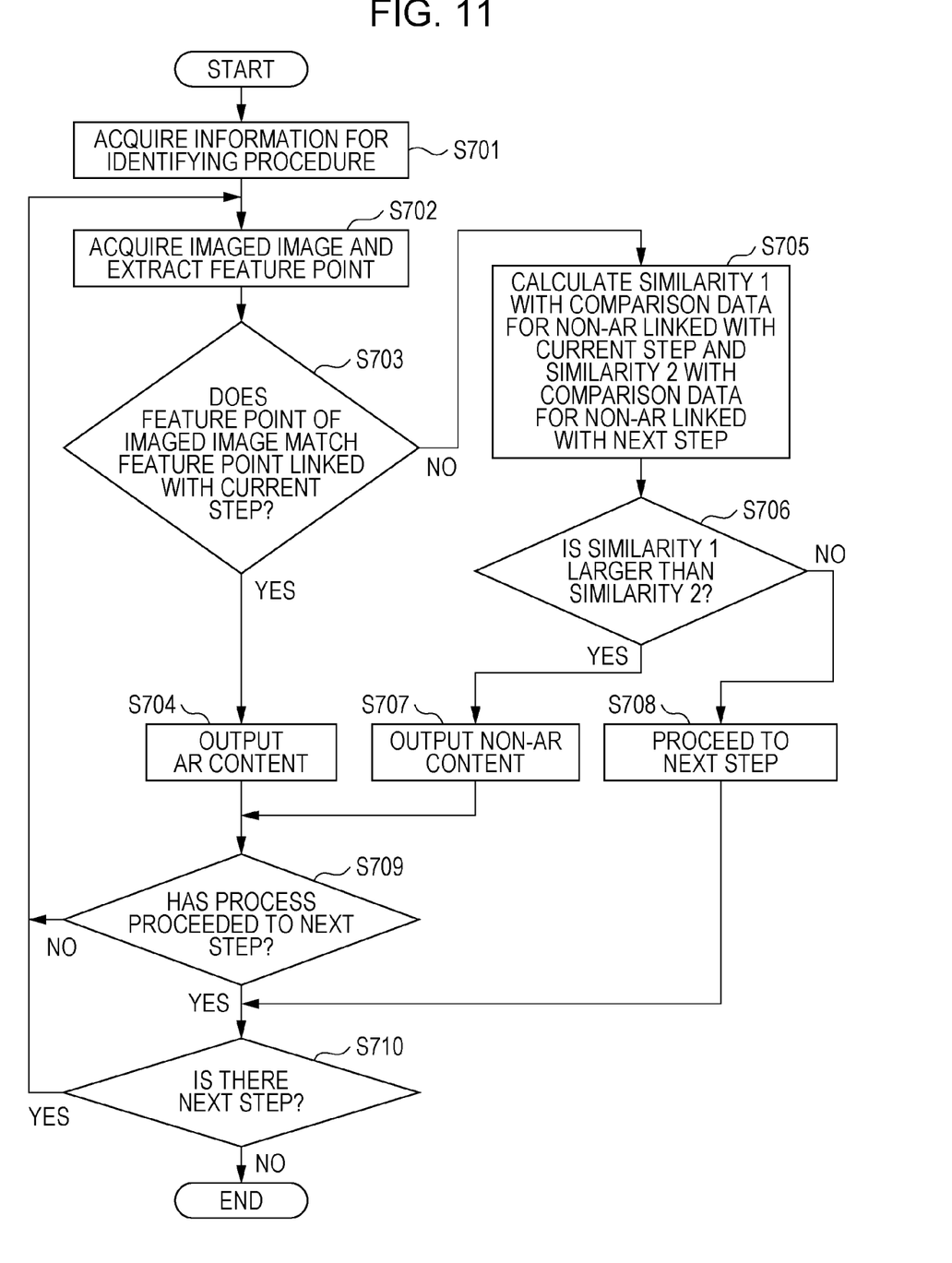
FIG. 11 is a flowchart illustrating an example of a process performed by the server for identifying a current step of a procedure on the basis of an imaged image.

FIG. 11 is a flowchart illustrating an example of a process performed by the server 10 for identifying a current step of a procedure on the basis of an imaged image. An example of a process performed by the server 10 for identifying each step of a procedure will be described below with reference to FIGS. 7 and 11.

First, the step control unit 11 acquires from the user terminal 30 information for identifying a procedure to be performed by the user for the image forming apparatus 50 (step 701). Next, the feature point extraction unit 12 performs processing for acquiring from the user terminal 30 an image obtained by imaging the image forming apparatus 50 by the user terminal 30 and extracting a feature point (step 702).

Then, the feature point comparison unit 13 determines whether or not the feature point extracted in step 702 matches feature point data linked with the current step (step 703). In the case where the feature point comparison unit 13 determines that the feature point extracted in step 702 and the feature point data match (YES in step 703), the content selection unit 15 outputs AR content linked with the current step to the user terminal 30 (step 704). Then, the step control unit 11 determines whether or not the user has proceeded to the next step (step 709). In the case where the step control unit 11 determines that the user has not proceeded to the next step (NO in step 709), the process returns to step 702 in which the feature point extraction unit 12 extracts a feature point of an imaged image.

In contrast, in the case where the step control unit 11 determines that the user has proceeded to the next step (YES in step 709), the step control unit 11 determines whether or not there is a next step (step 710).

In the case where the step control unit 11 determines that there is a next step (YES in step 710), the process returns to step 702 in which the feature point extraction unit 12 extracts a feature point of an imaged image.

In the case where the step control unit 11 determines in step 710 that there is no next step (NO in step 710), because all the steps of the procedure are completed, the process ends.

In the case where the feature point comparison unit 13 determines in step 703 that the feature point extracted in step 702 and the feature point data do not match (NO in step 703), the image recognition unit 14 calculates the similarity 1 between the extracted feature point and comparison data for non-AR linked with the current step (see FIG. 8) and the similarity 2 between the extracted feature point and comparison data for non-AR linked with the next step (step 705). Then, the step control unit 11 performs comparison between the similarity 1 and the similarity 2 that have been calculated by the image recognition unit 14, and determines whether or not the similarity 1 is larger than the similarity 2 (step 706). In the case where it is determined in step 706 that the similarity 1 is larger than the similarity 2 (YES in step 706), non-AR content is output (step 707). Then, the process performs the processing of step 709. In contrast, in the case where it is determined that the similarity 2 is larger than the similarity 1 (NO in step 706), the step control unit 11 proceeds to the next step (step 708). Then, the step control unit 11 performs the processing of step 710.

In the processing of step 706 of the flowchart illustrated in FIG. 11, the determination is made based on only the comparison between the similarity 1 and the similarity 2. Thus, in the case where both the similarity 1 and the similarity 2 are small, the actual step might not be the current step or the next step. Thus, even in the case where the similarity 1 is larger than the similarity 2, if the similarity 1 is smaller than a predetermined value, non-AR content is not necessarily output. Furthermore, even in the case where the similarity 2 is larger than the similarity 1, if the similarity 2 is smaller than a predetermined value, the processing of step 709 may be performed without the process proceeding to the next step.

Furthermore, the similarity 1 and the similarity 2 are not necessarily calculated using comparison data for non-AR. A similarity may be calculated based on an image of an existing manual or an image contained in non-specific content, and an image for calculating a similarity may be set in advance for each step.

Other Modifications

The image forming apparatus 50 has been described above as an example of an object on which the user performs a procedure. However, various other apparatuses may serve as an object on which the user performs a procedure in the operation navigation system 1 according to an exemplary embodiment. For example, a refrigerator, a PC, or a vehicle may serve as the object on which the user performs the procedure.

The user terminal 30 is not necessarily a smartphone and may be smart glasses or head-mounted display. A user wearing a glasses-type terminal can check an actual object on which the user performs the procedure and information about steps of the procedure by visually recognizing an image in which a virtual image or text is superimposed on a real object.

In an exemplary embodiment, procedure information in a relational database format illustrated in FIG. 8 has been described above. However, procedure information may be stored in other formats. For example, procedure information may be stored in extensible markup language (XML). In the case where a manual in the XML format is already provided, for example, feature point data for AR and AR content may be tagged for each step and stored for an existing manual in the XML format.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire an object image that is an image obtained by imaging an object;
identify, at each step of a procedure to be performed on the object, whether or not the object image is in a specific state associated with the step;
display, in a case where the object image is in the specific state, the object image in such a manner that first content associated with a current step of the procedure in the specific state is superimposed on the object image; and
display, in a case where the object image is not in the specific state, second, different content associated with the current step of the procedure to be performed on the object, wherein the second content is a content related to the current step of the procedure and extracted from an existing manual of the object.

2. The information processing apparatus according to claim 1,
wherein the identifying whether or not the object image is in the specific state is performed based on a feature point of the object,
wherein the specific state is a state in which a display position for displaying the first content in a superimposed manner is identifiable from the feature point of the object, and
wherein in a case where the object image is in the specific state, the object image is displayed in such a manner that the first content is superimposed on the display position.

3. The information processing apparatus according to claim 2,
wherein in a case where the display position is not identifiable, image recognition of the object image is performed, and
wherein in a case where a result of the image recognition satisfies a predetermined condition, the object image is displayed in such a manner that the second content associated with the predetermined condition is superimposed on the object image.

4. The information processing apparatus according to claim 3, wherein a priority order among two or more different types of image recognition methods is defined for each step of the procedure, and the image recognition of the object image at each step is performed according to the priority order.

5. The information processing apparatus according to claim 1,
wherein the processor is configured to identify the current step of the procedure by performing image recognition of the object image.

6. The information processing apparatus according to claim 5,
wherein a first similarity indicating a degree of similarity between the object image and an image associated with the current step is calculated,
wherein a second similarity indicating a degree of similarity between the object image and an image associated with a step subsequent to the current step is calculated, and
wherein the current step is updated based on the first similarity and second similarity.

7. The information processing apparatus according to claim 1,
wherein the first content is an AR content associated with the current step of the procedure to be performed on the object.

8. An information processing method comprising:

acquiring an object image that is an image obtained by imaging an object;

identifying, at each step of a procedure to be performed on the object, whether or not the object image is in a specific state associated with the step;

displaying, in a case where the object image is in the specific state, the object image in such a manner that first content associated with a current step of the procedure in the specific state is superimposed on the object image; and displaying, in a case where the object image is not in the specific state, second, different content associated with the current step of the procedure to be performed on the object, wherein the second content is a content related to the current step of the procedure and extracted from an existing manual of the object.

9. A non-transitory computer readable medium storing a program causing a computer to execute a process comprising:

acquiring an object image that is an image obtained by imaging an object;

identifying, at each step of a procedure to be performed on the object, whether or not the object image is in a specific state associated with the step;

displaying, in a case where the object image is in the specific state, the object image in such a manner that first content associated with a current step of the procedure in the specific state is superimposed on the object image; and displaying, in a case where the object image is not in the specific state, second, different content associated with the current step of the procedure to be performed on the object, wherein the second content is a content related to the current step of the procedure and extracted from an existing manual of the object.

* * * * *